(12) United States Patent
West

(10) Patent No.: US 11,220,358 B1
(45) Date of Patent: Jan. 11, 2022

(54) HYPERSONIC HARMONIC VEHICLE EXCITER AND METHODS OF USE THEREOF

(71) Applicant: Brandon West, Roswell, GA (US)

(72) Inventor: Brandon West, Roswell, GA (US)

(*) Notice: Subject to any disclaimer, the term of this patent is extended or adjusted under 35 U.S.C. 154(b) by 0 days.

(21) Appl. No.: 17/118,551

(22) Filed: Dec. 10, 2020

Related U.S. Application Data

(60) Provisional application No. 63/068,422, filed on Aug. 21, 2020.

(51) Int. Cl.
*B64G 1/22* (2006.01)
*B64G 1/40* (2006.01)
*G10K 11/32* (2006.01)
*B06B 1/02* (2006.01)

(52) U.S. Cl.
CPC ............ *B64G 1/409* (2013.01); *B06B 1/0207* (2013.01); *G10K 11/32* (2013.01)

(58) Field of Classification Search
CPC ...................................................... B64G 1/409
See application file for complete search history.

(56) References Cited

U.S. PATENT DOCUMENTS

| | | | | |
|---|---|---|---|---|
| 3,766,562 A | * | 10/1973 | Pollin | H01Q 1/28 343/705 |
| 2007/0029438 A1 | * | 2/2007 | Arata | B64C 19/00 244/1 N |
| 2017/0057614 A1 | * | 3/2017 | Janeke | B64C 1/38 |
| 2017/0082124 A1 | * | 3/2017 | Kremeyer | F41H 5/007 |
| 2017/0131076 A1 | * | 5/2017 | Quertelet | F42B 15/36 |

* cited by examiner

*Primary Examiner* — Richard G Davis
(74) *Attorney, Agent, or Firm* — Mathew Grell; Grell & Watson Patent Attorneys LLC

(57) ABSTRACT

A hypersonic harmonic exciter system to enable hypersonic speed, including a hypersonic harmonic exciter body having a plurality angled sides forming exciter body hollow structure with an access aperture, vibration inducing wave apparatus configured to produce and project vibration harmonic waves that converge on a convergence harmonic point forward of the hypersonic harmonic exciter body, the vibration inducing wave apparatus having vibration apparatus hollow structure with a series of exterior concentrically positioned vibration inducing bands, the vibration inducing wave apparatus inserted in the exciter body hollow structure, and harmonic sound projecting apparatus configured to produce and project harmonic sound waves that converge on the convergence harmonic point forward of the hypersonic harmonic exciter body, the harmonic sound projecting apparatus having sound apparatus hollow structure with a series of exterior concentrically positioned sound emitter bands, the harmonic sound projecting apparatus inserted in the vibration apparatus hollow structure.

20 Claims, 6 Drawing Sheets

HYPERSONIC HARMONIC VEHICLE EXCITER AND METHODS OF USE THEREOF

CROSS-REFERENCE TO RELATED APPLICATIONS

This application claims the priority benefit of U.S. Provisional Application No. 63/068,422, filed on Aug. 21, 2020, entitled "Hypersonic Harmonic Vehicle Exciter and Methods of Use", which is incorporated by reference herein in its entirety.

FIELD OF THE INVENTION

This disclosure relates to an exciter gliding body that can be attached to free falling, flying, or guided objects as a system and methods of use thereof. More specifically the disclosure relates to an accelerator to accelerate a craft at hypersonic speeds.

BACKGROUND

The current state of the art in hypersonic spacecraft travel is limited by three important challenges of what materials to use, the actual design of the aircraft, the proper propulsion power plant, and how to overcome air resistance. As an aircraft moves through the air, the air molecules near the aircraft are disturbed and move around the aircraft. Exactly how the air reacts to the aircraft depends upon the ratio of the speed of the aircraft to the speed of sound through the air, speed ratio MACH.

For aircraft speeds that are much greater than the speed of sound, the aircraft is to be hypersonic. Hypersonic flight has come to mean vehicles that undergo sustained travel, generally at speeds faster than Mach 5, which is five times faster than the speed of sound, (3,806 mph or 6,126 km/h), in the atmosphere. At hypersonic speeds, increased friction and air resistance need to be overcome by deploying new solutions.

Therefore, it is readily apparent that there is a need for a hypersonic harmonic vehicle exciter and methods of use thereof that functions to enable a combination of features that is designed to address at least some aspects of the problems discussed above. Moreover, providing a hypersonic harmonic vehicle exciter to achieve speeds faster than Mach 5 by overcoming increased friction and air resistance.

SUMMARY

Briefly described, in an example embodiment, the present disclosure overcomes the above-mentioned disadvantages and meets the recognized need for a hypersonic harmonic vehicle exciter and methods of use thereof, that generally includes a) Hypersonic Harmonic Vehicle Exciter Body/shell, b) a Vibration Inducing Wave Device, having a cone shaped base with a series of concentric ring of bands, the Vibration Inducing Wave Device configured to generate harmonic vibration wave patterns that converge on a convergence point forward of the Vehicle Bod/shell, the Vibration Inducing Wave Device configured to insert/fit therein the Hypersonic Harmonic Vehicle Exciter Body/shell, and c) a Hypersonic Harmonic Sound Projecting Device, having a cone shaped base, the cone shaped base having a plurality of sound emitters positioned facing forward, that converges on a convergence point forward of the Vehicle Body/shell, the Hypersonic Harmonic Sound Projecting Device configured to generate a harmonic sound wave, the Hypersonic Harmonic Sound Projecting Device further configured to insert/fit therein the Vibration Inducing Wave Device, wherein the vibration and the harmonic having a frequency, and the frequency increases with the speed of the structure to create a slip stream for the structure to traverse, and thus to facilitate a platform for accelerated trajectory of the structure attached to the platform.

The description states a spacecraft, but hypersonic harmonic vehicle exciter preferably used within the atmosphere or other resistive media. Specifically, it is designed to be used more within the lower and upper, and outer atmosphere. Hypersonic refers to aircraft, man and unmanned craft, and spacecraft that can reach speeds through the atmosphere faster than Mach 5, which is near 4,000 miles per hour. Propulsion systems to reach hypersonic include scramjet engine that burned liquid hydrocarbon fuel [JP-7] and any future propulsion systems or liquid or solid rocket motors with high-energy propellants developed in the future.

According to its major aspects and broadly stated, the present disclosure in its exemplary form is an attachment, preferably at the front end of other platforms or crafts, to increase the speed of the platforms or crafts moving through the atmosphere or other restrictive media, enabling or creating hypersonic acceleration.

In an exemplary embodiment, a hypersonic harmonic exciter system to enable hypersonic speed, including a hypersonic harmonic exciter body having a plurality angled sides forming an exciter body hollow structure with an access aperture, a vibration inducing wave apparatus configured to produce and project vibration harmonic waves that converge on a convergence harmonic point forward of the hypersonic harmonic exciter body, the vibration inducing wave apparatus having a vibration apparatus hollow structure with a series of exterior concentrically positioned vibration inducing bands, the vibration inducing wave apparatus inserted in the exciter body hollow structure, and a harmonic sound projecting apparatus configured to produce and project harmonic sound waves that converge on the convergence harmonic point forward of the hypersonic harmonic exciter body, the harmonic sound projecting apparatus having a sound apparatus hollow structure with a series of exterior concentrically positioned sound emitter bands, the harmonic sound projecting apparatus inserted in the vibration apparatus hollow structure.

In an exemplary embodiment, the method of enabling a hypersonic craft to travel at hypersonic speed, providing a hypersonic harmonic exciter body having a plurality angled sides forming an exciter body hollow structure with an access aperture, a vibration inducing wave apparatus configured to produce and project vibration harmonic waves that converge on a convergence harmonic point forward of the hypersonic harmonic exciter body, the vibration inducing wave apparatus having a vibration apparatus hollow structure with a series of exterior concentrically positioned vibration inducing bands, the vibration inducing wave apparatus inserted in the exciter body hollow structure, a harmonic sound projecting apparatus configured to produce and project harmonic sound waves that converge on the convergence harmonic point forward of the hypersonic harmonic exciter body, the harmonic sound projecting apparatus having a sound apparatus hollow structure with a series of exterior concentrically positioned sound emitter bands, the harmonic sound projecting apparatus inserted in the vibration apparatus hollow structure, affixing the nose of the hypersonic craft to the sound apparatus hollow structure, generating harmonic vibration patterns via vibration inducing wave apparatus to reduce a hypersonic condition, and generating harmonic sound patterns via harmonic sound projecting apparatus to reduce a hypersonic condition.

A feature of the hypersonic harmonic vehicle exciter and methods of use is the ability to reduce the effects of shock waves, heating and pressurizing the air to exponentially higher levels with increasing speed.

Another feature of the hypersonic harmonic vehicle exciter and methods of use is the ability to reduce the effects of hypersonic speeds, friction and air or other media resistance.

Yet another feature of the hypersonic harmonic vehicle exciter and methods of use is its ability to be affixed to the noses of aircraft.

Yet another feature of the hypersonic harmonic vehicle exciter and methods of use is its ability to be affixed to underwater transportation applications, or other underwater vehicles or portions of marine craft traversing through the water.

Yet another feature of the hypersonic harmonic vehicle exciter and methods of use is its ability to be affixed to spacecraft in decent or ascent phase of earth or other planets.

Yet another feature of the hypersonic harmonic vehicle exciter and methods of use is its ability to be affixed to projectiles.

Yet another feature of the hypersonic harmonic vehicle exciter and methods of use is its ability to be affixed to the noses of planes, manned or unmanned craft, watercraft, spacecraft, and other like applications, especially unmanned devices.

Yet another feature of the hypersonic harmonic vehicle exciter and methods of use is its ability to achieve higher speed hypersonic vehicles.

Yet another feature of the hypersonic harmonic vehicle exciter and methods of use is its ability to provide operations from longer ranges with shorter response or flight times.

These and other features of the hypersonic harmonic vehicle exciter and methods of use will become more apparent to one skilled in the art from the prior Summary and following Brief Description of the Drawings, Detailed Description of exemplary embodiments thereof, and Claims when read in light of the accompanying Drawings or Figures.

The terminology used herein is for the purpose of describing particular embodiments only and is not intended to limiting of the invention. As used herein, the term "and/or" includes any and all combinations of one or more of the associated listed items. As used herein, the singular forms "a", "an" and "the" are intended to include the plural forms as well as the singular forms, unless the contest clearly indicates otherwise. It will be further understood that the terms "compromises" and/or "comprising" when used in this specification, specify the presence of stated features, steps, operations, elements and/or components, but do not preclude the presence of addition of one or more other features, steps, operations, elements, components and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of thermal enhancements are disclosed. Each of these has individual benefit, and each can also be used in conjunction with one or more, or in some cases all, of the other disclosed techniques. Accordingly, for the sake of clarity, the description will refrain from repeating every possible combination of the individual steps in an unnecessary fashion. Nevertheless, the specification and claims should be read with the understanding that such combinations are entirely within the scope of the intervention and the claims.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

The present hypersonic harmonic vehicle exciter and methods of use will be better understood by reading the Detailed Description of the Preferred and Selected Alternate Embodiments with reference to the accompanying drawing Figures, in which like reference numerals denote similar structure and refer to like elements throughout, and in which.

The present invention will be better understood by reading the Detailed Description with reference to the accompanying drawings, which are not necessarily drawn to scale, and in which like reference numerals denote similar structure and refer to like elements throughout, and in which.

DETAILED DESCRIPTION

In describing the exemplary embodiments of the present disclosure, as illustrated in figures specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

Figure 1A:
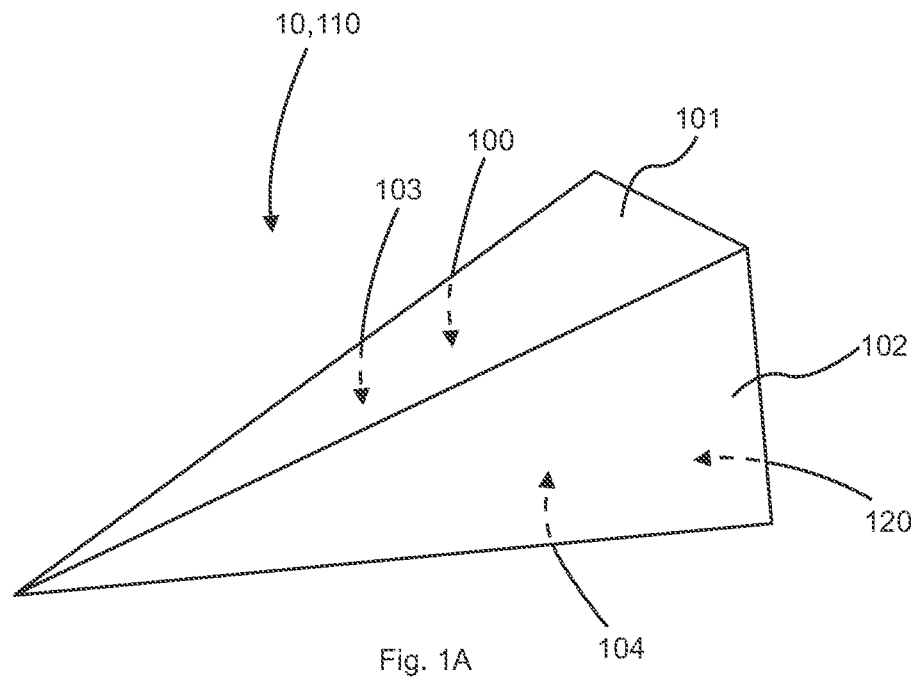
FIG. 1A is a perspective view of an exemplary embodiment of the hypersonic harmonic vehicle exciter body.
Figure 1B:
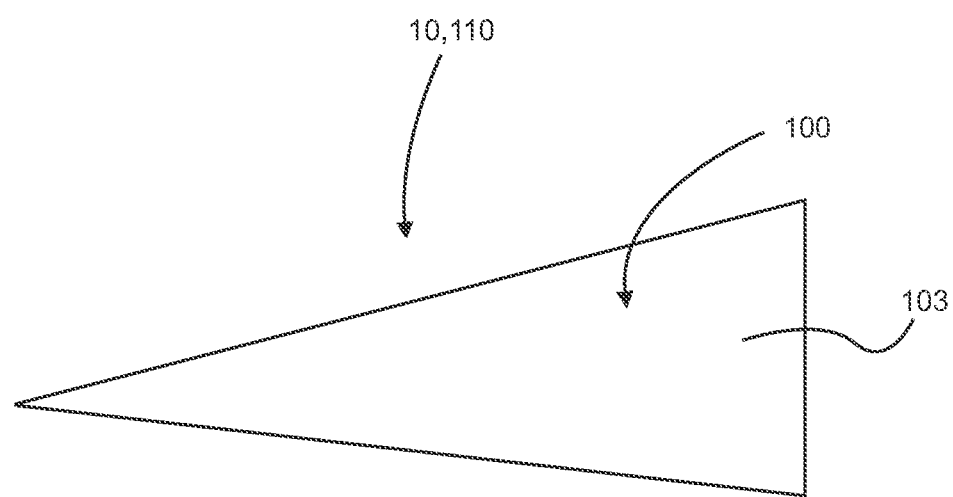
FIG. 1B is a side view of an exemplary embodiment of the hypersonic harmonic vehicle exciter system.
Figure 5A:
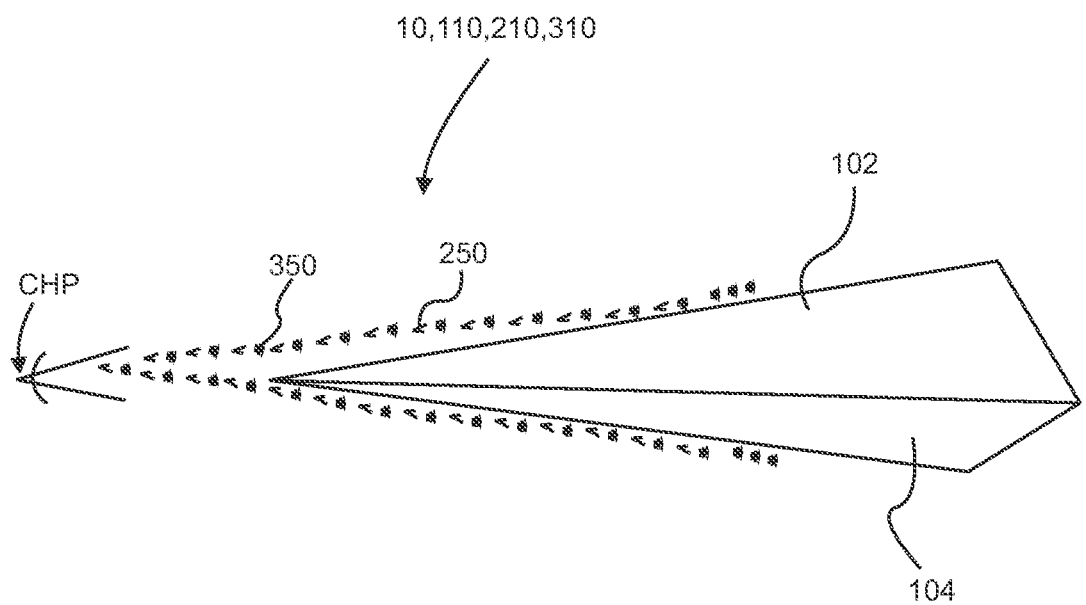
FIG. 5A is a side view of an exemplary embodiment of a hypersonic harmonic vehicle exciter assembly, according to FIGS. 1-4.
Figure 5B:
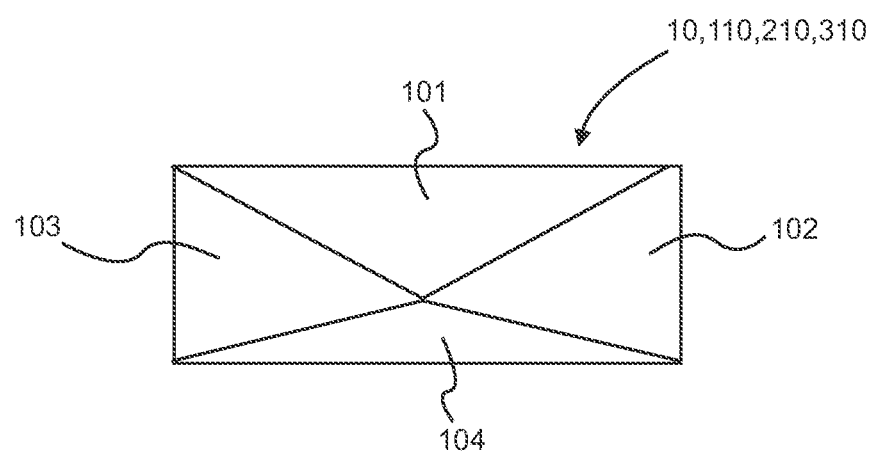
FIG. 5B is a front view of an exemplary embodiment of a hypersonic harmonic vehicle exciter assembly, according to FIG. 5A.

Referring now to FIGS. 1A, 1B, and 5B, by way of example, and not limitation, there is illustrated an example embodiment of vehicle or craft hypersonic harmonic exciter system 10 having harmonic vehicle exciter housing, shell, cone, or angle shaped hollow structure, such as hypersonic harmonic exciter body 110. Hypersonic harmonic exciter body 110 may be configured having one or more or plurality of angled or triangular shaped sides, such as upper or first angled side 101, right or second angled side 102, left or third angled side 103, bottom or fourth angled side 104, and aperture or access aperture 120 to receive a craft or other subsystems. Preferably, hypersonic harmonic exciter body 110 may be affixed to the front end or noses of a vehicle or craft, such as planes, manned or other unmanned aerial vehicles (UAVs) or like flying, gliding, or falling objects, watercraft, underwater transportation applications, or other underwater vehicles or portions of marine craft traversing through the water, spacecraft in decent or ascent phase of earth or other planets, manned or unmanned projectiles, gliding body, gliding vehicle, and other like applications, especially unmanned devices (the "hypersonic craft HC").

Hypersonic harmonic vehicle exciter body 100 may be formed of a barrier, structure or material, made of light weight material, refractory composite materials, high-temperature multi-layer insulation material, highly conductive materials to manage heat pathways inside of hypersonic craft HC, high-temperature seals, including carbon-carbon, compositionally complex alloys, ceramic, laser hardened, and the like ("barrier material") that will house or encapsulate exciter system 10 and its subcomponents or subsystems, such as constrained enhanced electronics for sensors, guidance, communications, propulsion systems, and payload and insulate or protect hypersonic harmonic vehicle exciter system 10 and its hypersonic craft HC from effects of shock waves, heating, vibration, and pressurizing due to hypersonic speeds ("hypersonic conditions").

It is recognized herein that hypersonic harmonic exciter system 10 may be configured to reduce the effects of shock waves, heating and pressurizing the air or other media to exponentially higher levels with increasing speed ("hypersonic conditions").

It is further recognized herein that hypersonic harmonic exciter system 10 may be configured to reduce the effects of hypersonic speeds, friction and air or other media resistance ("hypersonic conditions".

Figure 2A:
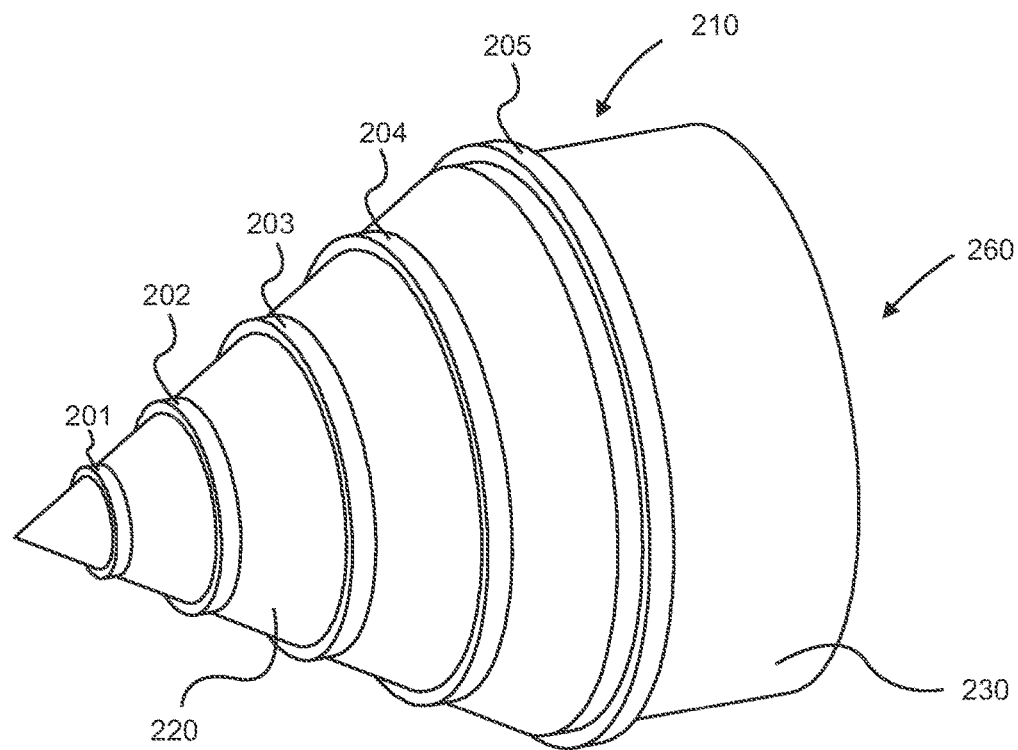
FIG. 2A is a perspective view of an exemplary embodiment of a hypersonic harmonic sound projecting body, according to FIG. 1.
Figure 2B:
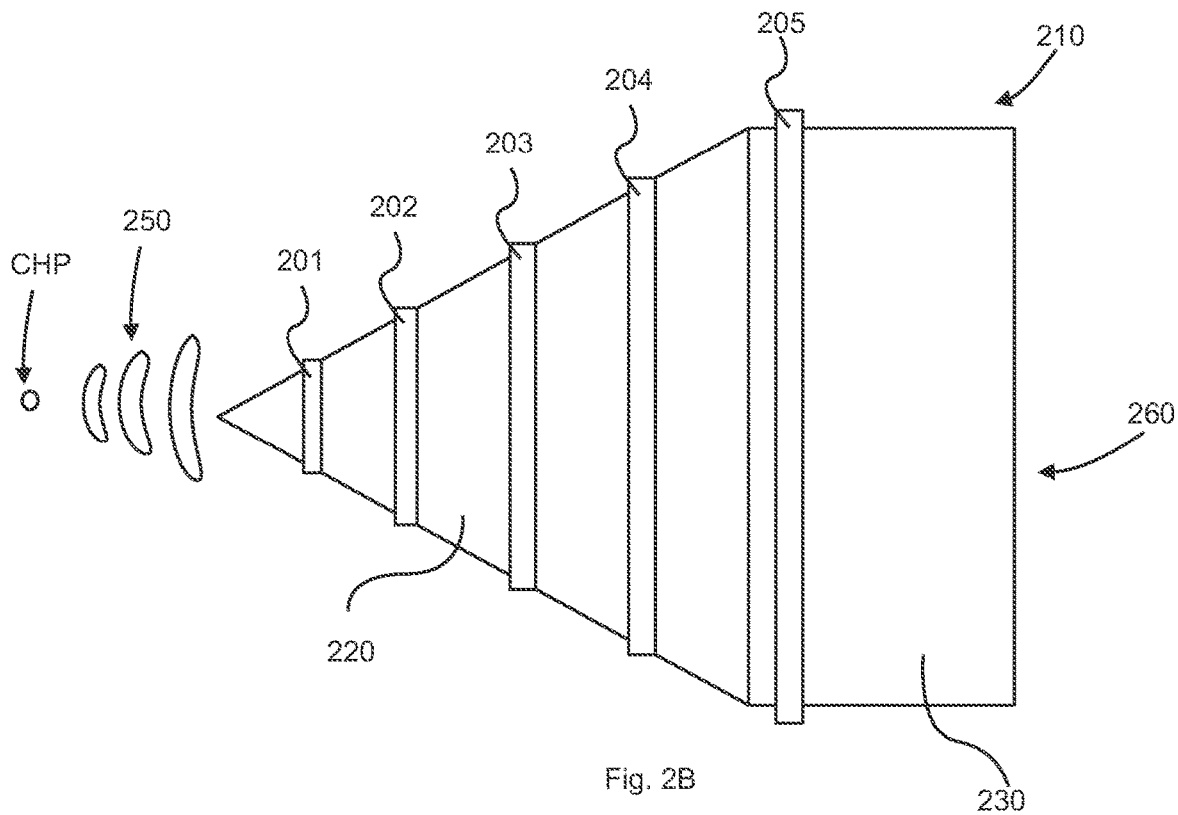
FIG. 2B is a side view of an exemplary embodiment of a hypersonic harmonic sound projecting system, according to FIG. 2A.

Referring now to FIGS. 2A, 2B and 5A, by way of example, and not limitation, there is illustrated an example embodiment of vehicle or craft hypersonic harmonic exciter system 10 having vibration inducing wave apparatus 210 configured to produce and project vibration harmonic waves in a manner consistent with the convergence of these waves, and project vibration harmonic waves outside and forward, of hypersonic harmonic exciter system 10 or hypersonic craft HC affixed to hypersonic harmonic exciter system 10. Vibration inducing wave apparatus 210 may be configured having a series of concentrically positioned vibration rings or steps of vibration inducing bands 200, such as first vibration band 201, second vibration band 202, third vibration band 203, fourth vibration band 204, fifth vibration band 205 to produce various vibration patterns and vibration harmonic waves at specific frequency (all possible harmonic frequencies) and in a manner consistent with the convergence of these vibration waves or harmonic vibration patterns 250, and project various vibration patterns and vibration harmonic waves outside and forward of convergence harmonic point CHP, of hypersonic harmonic exciter system 10 or hypersonic craft HC affixed to hypersonic harmonic exciter system 10 to counter or 1) reduce the effects of shock waves, heating and pressurizing the air or other media to exponentially higher levels with increasing speed, and/or 2) reduce the effects of hypersonic speeds, friction and air or other media resistance ("hypersonic conditions").

It is contemplated herein that vibration inducing bands 200 may be adjusted in power and frequency based upon the speed of hypersonic harmonic vehicle exciter system 10 or hypersonic craft HC affixed to hypersonic harmonic exciter system 10.

It is recognized herein that vibration inducing wave apparatus 210 may include power sources, electronics, controls, wiring, materials necessary and known by those skilled in the art make vibration inducing bands 200 vibrate or oscillate in air, an example media, to make the air molecules near, around, or outside and forward, of hypersonic harmonic exciter system 10 be moved back and forth in relation to the frequency and force of the vibration patterns and vibration harmonic waves and converge various vibration patterns and vibration harmonic waves outside and forward of convergence harmonic point CHP, of hypersonic harmonic exciter system 10 or hypersonic craft HC affixed to hypersonic harmonic exciter system 10.

It is contemplated herein that vibration inducing wave apparatus 210 may produce a variety of concentric rings of harmonic vibration patterns 250 utilizing one or more or any combination of vibration inducing bands 200 by driving them at different times or at the same time.

It is further contemplated herein that that vibration inducing wave apparatus 210 may be formed in any shape capable of reduce the effects of hypersonic speeds, friction and air or other media resistance. More specifically, vibration inducing wave apparatus 210 may be configured or positioned on a vibration apparatus hollow structure being cone shaped 220 having a cylindrical shaped 230 extension, and aperture or access aperture 260 to receive a craft or other subsystems.

Figure 3A:
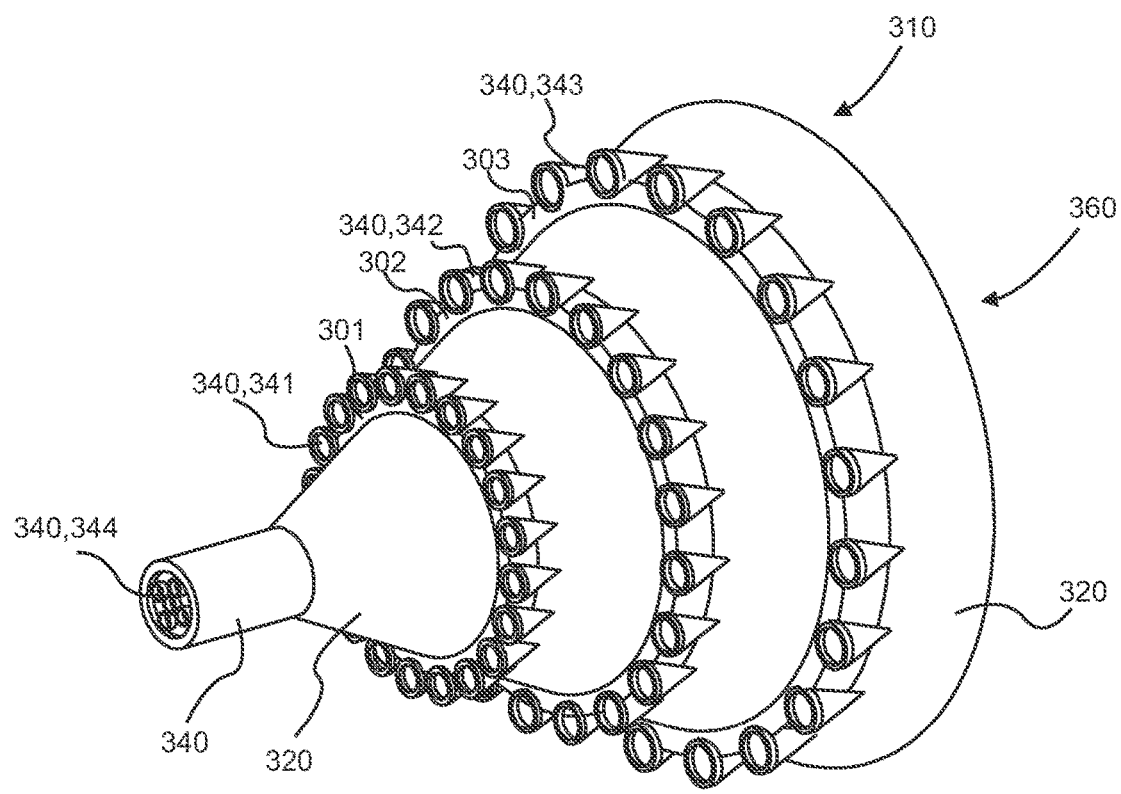
FIG. 3A is a perspective view of an exemplary embodiment of a vibration inducing wave system, according to FIG. 1.
Figure 3B:
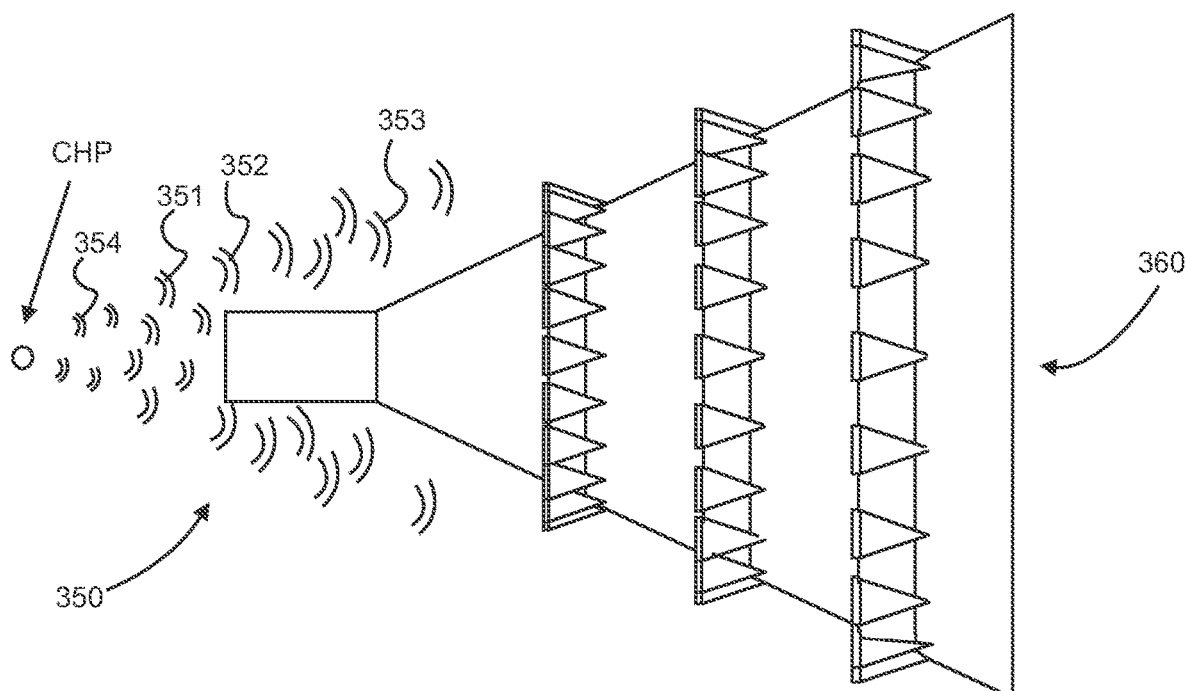
FIG. 3B is a side view of an exemplary embodiment of a vibration inducing wave system, according to FIG. 3A.

Referring now to FIGS. 3A, 3B and 5A, by way of example, and not limitation, there is illustrated an example embodiment of vehicle or craft hypersonic harmonic vehicle exciter system 10 having harmonic sound projecting apparatus 310 configured to produce and project harmonic sound waves in a manner consistent with the convergence of these waves, and project harmonic sound waves outside and forward, of hypersonic harmonic vehicle exciter system 10 or hypersonic craft HC affixed to hypersonic harmonic exciter system 10. Harmonic sound projecting apparatus 310 may be configured having a series of concentrically positioned or stepped sound wave emitter bands 300, such as first sound emitter band 301, second sound emitter band 302, and third sound emitter band 303. Each sound wave emitter bands 300 may include a plurality of spaced apart, forward facing sound emitters and of various size sound emitters 340 positioned on a circumference or curve, to produce various sound patterns and sound harmonic waves at specific frequency and in a manner consistent with the convergence of these sound harmonic waves or harmonic sound patterns 350, and project various sound patterns and sound harmonic waves outside and forward of convergence harmonic point CHP, of hypersonic harmonic exciter system 10 or hypersonic craft HC affixed to hypersonic harmonic exciter system 10 to counter or 1) reduce the effects of shock waves, heating and pressurizing the air or other media to exponentially higher levels with increasing speed, and/or 2) reduce the effects of hypersonic speeds, friction and air or other media resistance ("hypersonic conditions").

It is recognized herein that different concentrically positioned or stepped sound wave bands 300 may be configured for different sound frequencies or combinations of sound frequencies, such as third sound emitter band 303 and its sound emitters 343 may corresponds to the lower pitch sounds waves 354, such as 30 Hz, 60 Hz, 90 Hz. As the sound emitters 340, 341, 342 positioned on first sound emitter band 301 and second sound emitter band 302 that are configured smaller in size or diameter, such sound emitters 340, 341, 342 correspond to higher sound pitch waves 351, 352 harmonic frequency Hz sound waves.

Moreover, harmonic sound projecting apparatus 310 may include sound emitters 340, 344 positioned within an inner core funnel extension, which corresponding to highest pitch sound waves 354 pitch harmonic frequency Hz sound waves. "The Shrill" that is aimed at the same convergence harmonic point CHP, as that of the lower pitch sound waves.

It is contemplated herein that sound emitters 340 may be adjusted in power and frequency based upon the speed of hypersonic harmonic exciter system 10 or hypersonic craft HC affixed to hypersonic harmonic exciter system 10.

It is contemplated herein that sound emitters 340 on different emitter bands 300 may be adjusted in power and frequency based upon the speed of hypersonic harmonic exciter system 10 or hypersonic craft HC affixed to hypersonic harmonic exciter system 10.

It is further contemplated herein that sound emitters 340 may produce a variety of harmonic sound patterns 350 utilizing one or more or any combination of sound emitters 340 by driving them at different times or at the same time.

It is recognized herein that sound projecting apparatus 310 may include power sources, electronics, controls, wiring, materials necessary and known by those skilled in the art to make sound emitters 340 vibrate or oscillate in air, an example media, to make the air molecules near, around, or outside and forward, of hypersonic harmonic exciter system 10 be moved back and forth in relation to the frequency and force of the sound patterns and sound harmonic waves and converge various sound patterns and sound harmonic waves outside and forward of convergence harmonic point CHP, of hypersonic harmonic exciter system 10 or hypersonic craft HC affixed to hypersonic harmonic exciter system 10.

It is contemplated herein that sound projecting apparatus 310 may produce a variety of harmonic patterns utilizing one or more or any combination of sound emitters 340 by driving them at different times or at the same time.

It is further contemplated herein that that sound projecting apparatus 310 and sound emitters 340 may be formed in any shape capable of reduce the effects of hypersonic speeds, friction and air or other media resistance. More specifically, sound projecting apparatus 310 may be configured or placed on a sound apparatus hollow structure being funnel shaped 320 having aperture or access aperture 360 to receive a craft, such as hypersonic craft HC or other subsystems. Moreover, funnel shaped 320 may include a cylindrical shaped nose 340 extending forward therefrom.

Figure 4:
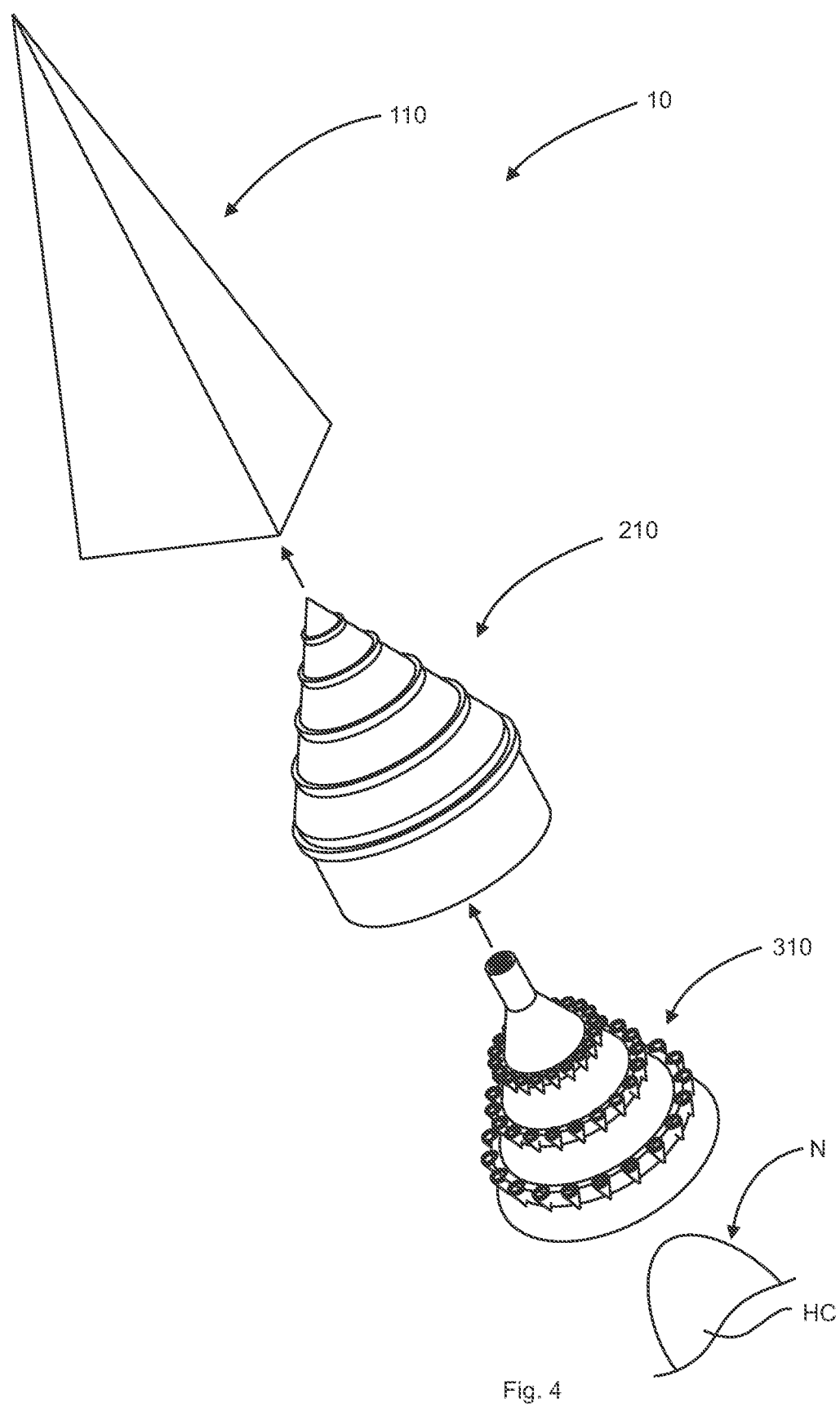
FIG. 4 is a perspective view of an exemplary embodiment of a hypersonic harmonic vehicle exciter assembly, according to FIGS. 1-3.

Referring now to FIG. 4, by way of example, and not limitation, there is illustrated an example embodiment of vehicle or craft hypersonic harmonic exciter system 10 assembly. As shown in FIG. 4, harmonic sound projecting apparatus 310 may be positioned in, inserted, and/or affixed vibration inducing wave apparatus 210, and vibration inducing wave apparatus 210 may be positioned in, inserted, and/or affixed thereto hypersonic harmonic exciter body 110 to form vehicle or craft hypersonic harmonic exciter system 10 assembly or such assembly may be affixed to a front end, such as nose N of hypersonic craft HC to 1) reduce the effects of shock waves, heating and pressurizing the air or other media to exponentially higher levels with increasing speed, and/or 2) reduce the effects of hypersonic speeds, friction and air or other media resistance of hypersonic craft HC travelling at hypersonic speeds ("hypersonic conditions").

Referring now to FIGS. 5A and 5B, by way of example, and not limitation, there is illustrated an example embodiment of vehicle or craft hypersonic harmonic vehicle exciter system 10 with a variety of harmonic vibration patterns 250 and/or harmonic sound patterns 350 focused outside and forward, of hypersonic harmonic exciter system 10 to convergence harmonic point CHP.

Hypersonic harmonic vehicle exciter system 10 may further include electric cables, control circuitry, processors, capacitor bank, roll control system, sensors, vehicle position sensors, and other electrical subsystems that are well known in the art of automatic control systems capable of withstanding hypersonic speed conditions.

Figure 6:
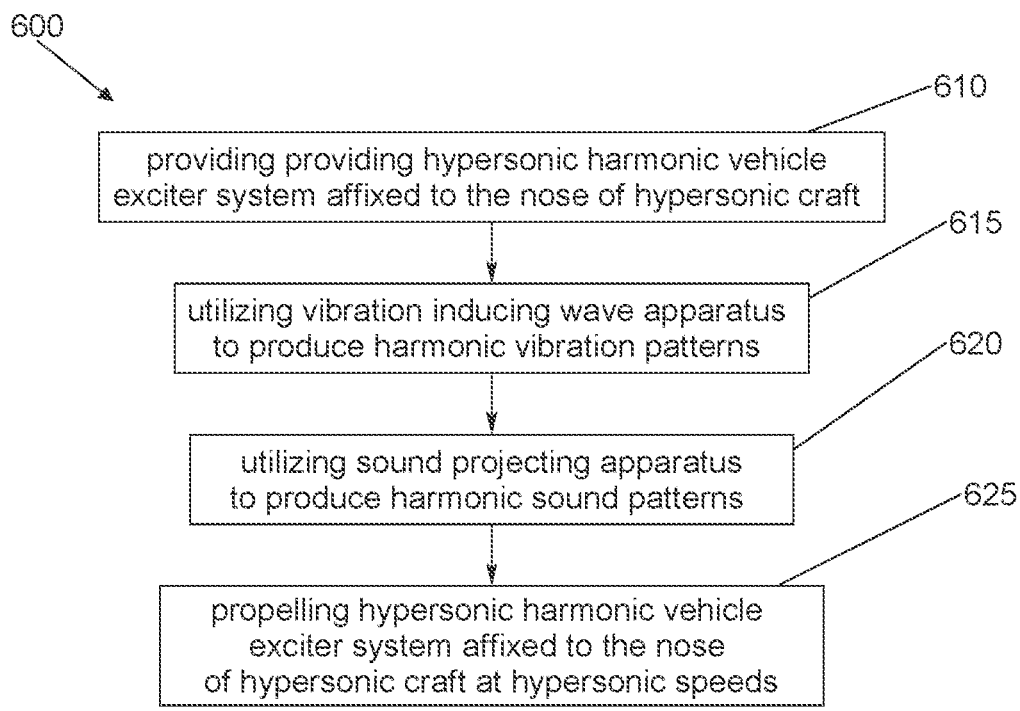
FIG. 6 is a flow diagram of a method of propelling spacecraft at hypersonic speed based on hypersonic harmonic vehicle exciter assembly.

Referring now to FIG. 6, there is illustrated a flow diagram 600 of a method of use of hypersonic harmonic exciter system 10 to propel or enable hypersonic craft HC to travel at hypersonic speed, as shown in FIGS. 1-5. In block or step 610, providing hypersonic harmonic exciter system 10 affixed to the nose of hypersonic craft HC. In block or step 615, utilizing vibration inducing wave apparatus 210 to generate/generating/produce harmonic vibration patterns 250 focused outside and forward, of hypersonic harmonic exciter system 10 to converge thereon convergence harmonic point CHP positioning one or more hypersonic harmonic exciter system 10 to counter or 1) reduce the effects of shock waves, heating and pressurizing the air or other media to exponentially higher levels with increasing speed, and/or 2) reduce the effects of hypersonic speeds, friction and air or other media resistance of hypersonic craft HC travelling at hypersonic speed ("hypersonic conditions").

In block or step 620, utilizing sound projecting apparatus 310 to generate/generating/produce harmonic sound patterns 350 focused outside and forward, of hypersonic harmonic exciter system 10 to converge thereon convergence harmonic point CHP positioning one or more hypersonic harmonic exciter system 10 to counter or 1) reduce the effects of shock waves, heating and pressurizing the air or other media to exponentially higher levels with increasing speed, and/or 2) reduce the effects of hypersonic speeds, friction and air or other media resistance of hypersonic craft HC travelling at hypersonic speed ("hypersonic conditions").

In block or step 525, propelling hypersonic harmonic exciter system 10 affixed to the nose of hypersonic craft HC in a desired direction and vector at hypersonic speeds.

It is contemplated herein that one or more hypersonic harmonic exciter system 10 may be utilized to accelerate or decelerate hypersonic craft HC.

It is further contemplated herein that two or more hypersonic harmonic exciter system 10 may be configured to synchronize and tune to each other.

The foregoing description and drawings comprise illustrative embodiments of the present disclosure. Having thus described exemplary embodiments, it should be noted by those ordinarily skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments of the disclosure will come to mind to one ordinarily skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail, it should be understood that various changes, substitutions and alterations can be made thereto without departing from the spirit and scope of the disclosure as defined by the appended claims. Accordingly, the present disclosure is not limited to the specific embodiments illustrated herein, but is limited only by the following claims.

The invention claimed is:

1. A hypersonic harmonic exciter system to enable hypersonic speed, said system comprising:
    a hypersonic harmonic exciter body having a plurality angled sides forming an exciter body hollow structure with an access aperture;
    a vibration inducing wave apparatus configured to produce and project vibration harmonic waves that converge on a convergence harmonic point forward of said hypersonic harmonic exciter body, said vibration inducing wave apparatus having a vibration apparatus hollow structure with a series of exterior concentrically positioned vibration inducing bands, said vibration inducing wave apparatus inserted in said exciter body hollow structure; and
    a harmonic sound projecting apparatus configured to produce and project harmonic sound waves that converge on said convergence harmonic point forward of said hypersonic harmonic exciter body, said harmonic sound projecting apparatus having a sound apparatus hollow structure with a series of exterior concentrically positioned sound emitter bands, said harmonic sound projecting apparatus inserted in said vibration apparatus hollow structure.

2. The system of claim 1, wherein said hypersonic harmonic exciter body is formed of a barrier material.

3. The system of claim 2, wherein said barrier material protects said hypersonic harmonic exciter body from hypersonic conditions.

4. The system of claim 3, wherein said plurality angled sides are shaped triangular.

5. The system of claim 1, wherein said vibration inducing bands are configured having a first vibration band, a second vibration band, a third vibration band, a fourth vibration band, and a fifth vibration band.

6. The system of claim 1, wherein said vibration inducing bands produce said vibration harmonic waves.

7. The system of claim 3, wherein said vibration harmonic waves counter said hypersonic conditions.

8. The system of claim 7, wherein said vibration harmonic waves are configured to be adjusted in a power and a frequency based on a hypersonic speed of said hypersonic harmonic exciter body.

9. The system of claim 1, wherein said vibration apparatus hollow structure is cone shaped.

10. The system of claim 1, wherein said sound emitter bands are configured having a first sound emitter band, a second sound emitter band, a third sound emitter band.

11. The system of claim 10, wherein said sound emitter bands further comprise a plurality of forward facing sound emitters.

12. The system of claim 1, wherein said sound emitters produce said harmonic sound waves.

13. The system of claim 3, wherein said harmonic sound waves counter said hypersonic conditions.

14. The system of claim 13, wherein said harmonic sound waves are configured to be adjusted in a power and a frequency based on a hypersonic speed of said hypersonic harmonic exciter body.

15. The system of claim 1, wherein said sound apparatus hollow structure is funnel shaped.

16. The system of claim 14, wherein said sound emitters are configured to be adjusted in said frequency based on a hypersonic speed of said hypersonic harmonic exciter body.

17. The system of claim 14, wherein said sound emitters on each of said sound emitter bands are configured to be adjusted in said frequency based on a hypersonic speed of said hypersonic harmonic exciter body.

18. The system of claim 1, further comprises a hypersonic craft having front end, wherein said front end is inserted in said vibration apparatus hollow structure.

19. The method of enabling a hypersonic craft having a nose to travel at hypersonic speed, said method comprising the steps of:
    providing a hypersonic harmonic exciter body having a plurality angled sides forming an exciter body hollow structure with an access aperture, a vibration inducing wave apparatus configured to produce and project vibration harmonic waves that converge on a convergence harmonic point forward of said hypersonic harmonic exciter body, said vibration inducing wave apparatus having a vibration apparatus hollow structure with a series of exterior concentrically positioned vibration inducing bands, said vibration inducing wave apparatus inserted in said exciter body hollow structure, a harmonic sound projecting apparatus configured to produce and project harmonic sound waves that converge on said convergence harmonic point forward of said hypersonic harmonic exciter body, said harmonic sound projecting apparatus having a sound apparatus hollow structure with a series of exterior concentrically positioned sound emitter bands, said harmonic sound projecting apparatus inserted in said vibration apparatus hollow structure;
    affixing the nose of the hypersonic craft to said sound apparatus hollow structure;
    generating harmonic vibration patterns via vibration inducing wave apparatus to reduce a hypersonic condition; and
    generating harmonic sound patterns via harmonic sound projecting apparatus to reduce a hypersonic condition.

20. The method of claim 19, further comprises the step of propelling the hypersonic craft at a hypersonic speed.

* * * * *